INVENTORS
ALVIN W. MUELLER
LYLE R. PERRY

BY Cohn and Powell
ATTORNEYS

United States Patent Office 3,129,003
Patented Apr. 14, 1964

3,129,003
BALL BAT WITH REINFORCED HANDLE
Alvin W. Mueller and Lyle R. Perry, Ferguson, Mo., assignors to Mueller-Perry Co. Inc., Ferguson, Mo., a corporation of Missouri
Filed Sept. 29, 1960, Ser. No. 59,359
8 Claims. (Cl. 273—72)

This invention relates generally to improvements in a ball bat and more particularly to a strengthened bat.

Heretofore, especially in supervised league play, if a bat were cracked, such bat was usually discarded and had to be replaced. The repair of a cracked bat by any of the previously known and conventional processes resulted in a finished product that was greatly weakened in strength as compared with the original unbroken bat, and thereby considerably increased the possibility of refracture and provided reduced hitting qualities.

It is an important object of the present invention to provide a repaired bat that has at least the same strength as a new bat, and in fact, is very much reinforced in strength by the particular method of reconditioning.

Another important object is realized in that the woven sleeve of glass fibers such as that sold under the trademark Fiberglas when bonded to the bat handle provides a rough, grid-like surface that improves the grip.

Moreover, the repaired bat has hitting qualities that are equal to, if not better than, those of a new bat, and is virtually unbreakable.

An important object is achieved in that organizations who sponsor amateur baseball and softball teams can save the expenditure of replacing bats. Of course, the same savings can be made by individuals or by professional ball teams.

Another important object is realized in that the conditioned bat can be used without incurring any violation of the present official rules of either amateur or professional leagues.

Still another important object is achieved in that the process is not limited just to the repair of broken bats, but can be advantageously applied to new bats to increase their strength and hitting qualities, and thereby make such new bats virtually indestructible. This reinforcement of new bats eliminates, or at least reduces to an absolute minimum, replacement expenditures.

Yet another important object is afforded by providing a ball bat that has a glass fiber sleeve pressed tightly on the handle and a plastic coating on the sleeve to fix the sleeve in place. Other important advantages are realized by utilizing a woven glass fiber sleeve that is adapted to expand in diameter upon compression in a longitudinal direction and adapted to contract in diameter upon tension in a longitudinal direction. The sleeve is arranged on the handle so that the greatest tensile strength is along the longitudinal axis of the handle, such an arrangement enhancing the strength and hitting qualities of the bat.

An important object is provided by the plastic coating applied over the glass fiber sleeve and applied to fill the interstices of the weave, the epoxy resin constituting the plastic having approximately the same tensile strength as the wood material of the bat. When the glass fiber sleeve is bonded by the resin in the manner described, the sleeving structure has a tensile strength that is four to five times that of the wood.

Still another important object is achieved by using a woven glass fiber sleeve of the type described previously, pushing the sleeve over the handle as permitted by lateral expansion and then pulling the sleeve under tension to press the sleeve tight against the handle. When held by the plastic coating, the sleeving structure greatly increases the tensile strength of the bat in the direction in which such strength is needed to resist any bending moment when the bat strikes a ball.

Briefly, the method of conditioning the bat comprises the steps of bonding the cracked handle together, if the handle is cracked, then applying a coat of plastic to the handle after first removing any wood finish, pushing a woven glass fiber sleeve over the handle and positioning one sleeve end adjacent the handle end, stroking the sleeve longitudinally toward the opposite end so as to press the sleeve tight by tension against the handle, then applying another coat of plastic over the sleeve, being sure to fill the fabric weave, and then allowing the plastic to cure.

It is an important object to provide a sleeving structure that is simple and durable in construction, economical to manufacture, efficient in operation, and which can be readily applied by any one with very little instruction.

The foregoing and numerous other objects and advantages of the invention will more clearly appear from the following detailed description of a preferred embodiment, particularly when considered in connection with the accompanying drawing, in which.

Figure 1:
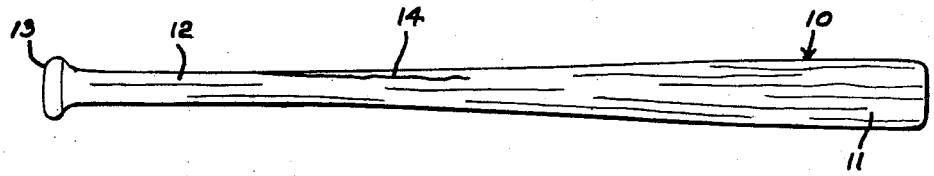
FIG. 1 is a side view of a ball bat having a cracked handle.

Referring now by characters of reference to the drawing, and first to FIG. 1, it is seen that the ball bat generally indicated at 10 is of the usual wood construction. Specifically, the bat 10 includes a relatively thick end 11 that tapers toward the opposite end to form a handle 12 of a thickness so that the handle can be advantageously and easily gripped by the hands of the ballplayer. In most cases, the handle end is provided with a knob 13 that helps to keep the player's hands from slipping off of the handle 12.

The process to be described may be performed on a bat 10 that is in perfect condition or one that has a crack 14 in the handle 12. As explained previously this process reconditions a cracked bat to make it just as good as, if not better than, a new bat, and conditions a new bat to make it virtually indestructible.

It will be assumed that the bat handle 12 does have a crack 14. The first step in the repair of such a bat is to sand the handle 12 with an emery cloth to remove the finish. Under the present baseball rules, care should be taken so that the finish is not removed beyond 18 inches when working with a conventional size bat and not removed beyond 16 inches when working with a smaller size bat adapted for little league baseball. Any splinters that may prevent closing of the crack are trimmed away.

Then the plastic is mixed. This plastic consists preferably of an epoxy resin and a hardener which, when mixed together, react chemically to form a hard strong solid composition. These materials are chosen so that the complete reaction requires approximately 40 minutes. In lieu of the epoxy resin, a polyester resin may be utilized.

After the plastic has been mixed, the crack 14 is pried open and the plastic is applied to the crack with a thin instrument such as a knife. The plastic is worked in thoroughly and the crack 14 is closed together by compressing the handle 12 with the hands. One or more small nails are driven into the handle 12 to hold the crack 14 tight and to squeeze out excess plastic.

Figure 2:
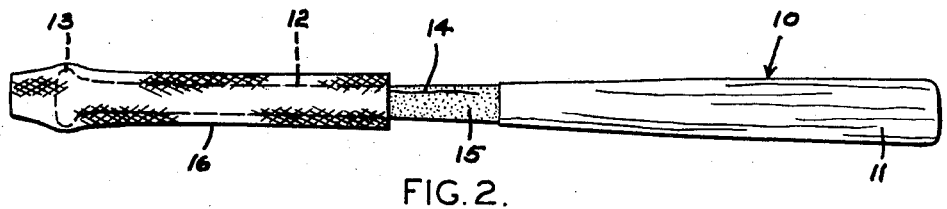
FIG. 2 is a side view of the ball bat showing the fabric sleeve being slipped over the bat handle.
Figure 3:
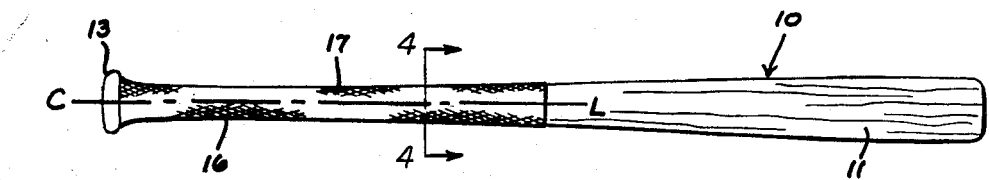
FIG. 3 is a side view of the bat showing the sleeve positioned and fixed in place.
Figure 4:
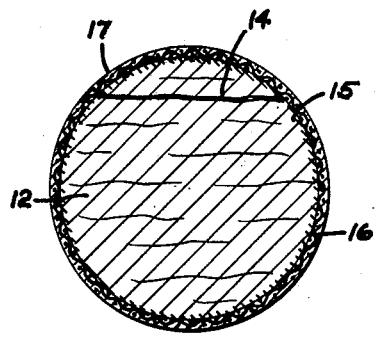
FIG. 4 is an enlarged cross sectional view of the reconditioned bat handle as seen along line 4—4 of FIG. 3.

The next step in the process is to paint the handle 12 with a fairly heavy coat of plastic, this initial plastic coat being indicated by reference numeral 15 in FIGS. 2 and 4. Then, an elongate, tubular fabric sleeve 16 is placed over the handle 12 and over the first plastic coating 15.

Figure 5:
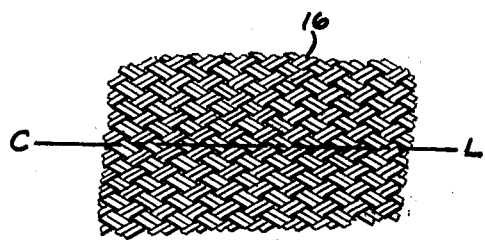
FIG. 5 is a fragmentary, enlarged plan view of the fabric sleeve.

The fabric sleeve 16 is woven from a glass fiber material and is woven in a manner such that the weave will permit an expansion in diameter upon compression in a longitudinal direction and will tend to contract in diameter upon tension in a longitudinal direction. The type of weave utilized in the glass fiber sleeve 16 is best illustrated in FIG. 5. It will be noted that the greatest tensile strength of the sleeve as provided by the weave is in the longitudinal direction indicated by center line CL.

To install the glass fiber sleeve, it is more convenient to hold the bat handle 12 up in a vertical position. The open end of sleeve 16 is spread apart and fitted over the knob 13. Then the sleeve is gently pushed over the knob and over the handle 12. It is important that the sleeve be pushed on because it will be readily apparent that the compressive forces exerted on the sleeve 16 upon such action cause lateral expansion to accommodate the large knob and the particular handle size. It should not be attempted to pull the sleeve 16 over the handle because the particular weave of the sleeve will cause the fabric to contract tight against the handle, and hinder or prevent installation. From FIG. 2 it will be seen that the fabric sleeve 16 laterally expands upon pushing it over the knob and handle 12.

When the top end of the sleeve 16 is disposed in its proper position immediately adjacent the knob 13, the sleeve is pressed tight over the first plastic coat 15 and over the handle 12. The sleeve is arranged by pressing the top end tight against the bat and the sleeve is stroked downwardly toward the opposite end using a light pressure. This action exerts a tension on the fabric that causes the sleeve to contract in diameter tight against the bat handle 12. For reasons which will appear later, it is extremely important that the fabric weave of the sleeve 16 be arranged so that the greatest tensile strength is in a direction along the longitudinal axis of the bat handle. The relative disposition of the fabric weave of sleeve 16 to the longitudinal axis indicated by center line CL is best shown in FIG. 5.

The fabric sleeve 16 is painted with another coat of the plastic 17, making sure that the fabric weave is filled. The plastic is then allowed to cure. Optimum curing takes at least six hours at a temperature of not less than 70 degrees F. Upon curing the plastic forms an extremely hard strong solid. The reconditioned handle can then be sanded with emery cloth to obtain the desired grip after the plastic has hardened.

Obviously, if a new bat were being processed the same procedural steps would be carried out except that there would be no crack to be glued together. Otherwise the process is the same.

Briefly, the method of processing the ball bat comprises the steps of gluing any crack 14 in the handle 12 together, removing any finish on the handle 12 by sanding, applying a first plastic coat 15 to the handle, placing a glass fiber sleeve 16 on the handle over the first plastic coat 15, the glass fiber sleeve 16 being woven so as to expand in diameter upon applying compression in a longitudinal direction and tending to contract in diameter upon applying tension in a longitudinal direction, the placement of the sleeve 16 being accomplished by pushing the glass fiber sleeve 16 under compression over the handle end 12 as permitted by the lateral expansion of the sleeve 16, arranging the weave of the glass fiber sleeve 16 so that the greatest tensile strength is along the longitudinal axis of the bat, positioning one end of the sleeve 16 adjacent the handle end 13, drawing the glass fiber sleeve 16 tight against the handle 12 by pulling the sleeve longitudinally, applying a second plastic coat 17 over the glass fiber sleeve 16 being sure to fill the weave, and allowing the plastic to cure for at least six hours at a temperature not less than 70 degrees F.

The ball bat, as an article of manufacture, includes an unfinished handle 12 having a first plastic coat 15, a glass fiber sleeve 16 on the handle 12 over the first plastic coat 15, the weave of the sleeve 16 being arranged so that the greatest tensile strength is in a direction along the longitudinal axis of the handle, the sleeve 16 being pulled tight under tension against the handle 12, and a second plastic coat 17 over the sleeve 16 and filling the weave of such sleeve 16.

The sleeving structure provided by the glass fiber sleeve 16 bonded with the epoxy resin, has a tensile strength 4 to 5 times that of the bat and greatly increases the tensile strength of the bat in the direction in which such strength is needed to resist any bending moment when the bat strikes a ball. However, the modulus of elasticity of the sleeving structure is substantially the same as that of the bat, thereby providing an extremely desirable condition.

For example, a new 29 inch ball bat was tested for strength. The knob 13 was held fixed in place and a fulcrum member was placed under the bat 9 inches from the knob end. Load was applied in 22.34 pound increments on the top side of the bat at a distance of 17.8 inches from the knob end, and the deflection was measured at the tip of the bat. This particular bat cracked upon application of a load of a little over 300 pounds and at a tip deflection of a little over 3 inches.

This cracked bat was then repaired by the process described above and retested under the same conditions. This repaired bat did not bend as much for any given load and it took 89 pounds more load to cause it to fail. When the repaired bat did fail, it did not break in two, but only cracked and was still able to support 223.4 pounds.

The additional strength derived from the sleeving structure provides a better grip, provides a stiffer bat able to withstand a greater impact load such as is exerted upon striking a ball, and also provides less deflection for any given load impact. These conditions enable the ball bat to impart a greater driving force to the ball, and thereby improves the hitting of the ball player.

Although the invention has been described by making detailed reference to a preferred method of conditioning a ball bat and to a preferred embodiment of such bat, such detail is to be understood in an instructive, rather than in any restrictive sense, many variants, being possible within the scope of the claims hereunto appended.

We claim as our invention:

1. In a round baseball bat made of substantially rigid material, having an impact portion and an elongated handle extending from the impact portion; a reenforcement layer superposed around the handle and terminating short of the impact portion whereby the impact portion is free of the said layer, the layer comprising a plurality of crossed strands of resistingly elongatable flexible material, all of which crossed strands extend from end to end of the handle to provide a longitudinally and transversely continuous seamless sleeve, the strands being taut and snugly disposed about the handle, an adhesive impregnating the strands, and also bonding the sleeve to the handle throughout the length of the sleeve; the impregnating adhesive and resistingly elongatable strands being of such materials that the bonded sleeve has a modulus of elasticity at least substantially as great as that of the bat and yet below a value that would interfere with the normal resiliency of the bat in driving a ball, and the sleeve providing a lengthwise, bonded strand arrangement extending continuously substantially from end to end of the handle in such wise that the strands provide continuous, unbroken paths along the surface of the handle lengthwise of its axis, to receive the impact and bending forces that are produced in the bat when an object is batted so that the strands restrict the bending strains in the bat.

2. The bat of claim 1 wherein said sleeve strands comprise interwoven criss-crossed strands.

3. The bat of claim 1 wherein said sleeve strands comprise glass fiber strands.

4. The bat of claim 1 wherein the adhesive is an epoxy resin.

5. The bat of claim 4 wherein said sleeve strands comprise glass fiber strands.

6. The bat of claim 1 wherein the handle has varying diameters between its ends, the crossed strands are interwoven and provide a tubular fabric disposed on the bias with respect to the bat handle, so that the tubular fabric has varying diameters corresponding to those of the handle, and is taut lengthwise of the handle, disposing its strands snugly onto the handle whereto they are bonded by the adhesive as aforesaid.

7. The bat of claim 1 wherein the adhesive comprises a layer disposed on the bat handle into which the sleeve is embedded, and a layer over the sleeve and within the interstices of the strands.

8. In a baseball bat of substantially rigid material, having an impact portion and an elongated handle extending from the impact portion; the handle being round and varying in diameter between its ends; a reenforcing sleeve superposed around the handle terminating short of the impact portion and extending from adjacent to the impact portion toward the opposite end of the handle, the sleeve comprising a continuous tube of braided material surrounding the handle; the tube being formed of braided glass fiber woven on the bias in two sets of strands at angles to each other, all of the strands extending from end to end of the tube, so that the tube, prior to bonding thereof to the handle, may be drawn taut lengthwise with accompanying reduction of diameter, and vice versa, the strands of the tube being taut lengthwise of the handle, the taut strands lying close to the handle throughout its length, and the tube following the varying contour of the handle; an epoxy resin adhesive in impregnating relation to the strands and also being disposed over the handle of the bat inside of the strands, the adhesive bonding the tube to the handle and bonding the strands of the tube together throughout its length, the bonded sleeve having a modulus of elasticity at least substantially equal to that of the bat and yet below a value that would interfere with the normal resiliency of the bat in driving a ball.

References Cited in the file of this patent

UNITED STATES PATENTS

| | | |
|---|---|---|
| 338,216 | Atwood | Mar. 16, 1886 |
| 1,441,476 | Baker | Jan. 9, 1923 |
| 2,535,033 | Bergere | Dec. 26, 1950 |
| 2,602,766 | Francis | July 8, 1952 |
| 2,610,057 | Hunt | Sept. 9, 1952 |
| 2,659,605 | LeTourneau | Nov. 17, 1953 |
| 2,795,523 | Cobb et al. | June 11, 1957 |
| 2,815,015 | De Giacomo | Dec. 3, 1957 |
| 2,924,546 | Shaw | Feb. 9, 1960 |
| 2,967,710 | Carlson | Jan. 10, 1961 |
| 3,025,062 | Duffin | Mar. 13, 1962 |

FOREIGN PATENTS

| | | |
|---|---|---|
| 15,872 | Great Britain | 1885 |
| 27,613 | Great Britain | 1910 |
| 1,232,773 | France | Apr. 25, 1960 |

(Corresponding British Patent 854,663, Nov. 23, 1960.)

OTHER REFERENCES

Keller, ABC News, Published by American Amateur Baseball Congress, May 1955.